United States Patent Office 2,789,109
Patented Apr. 16, 1957

2,789,109

NEUTRALIZATION OF ALKALI METAL HYDROXIDE CATALYSTS IN ORGANOPOLYSILOXANES

Willard T. Grubb, Jr., Schenectady, N. Y., assignor to General Electric Company, a corporation of New York No Drawing. Application June 29, 1954,
Serial No. 440,277

6 Claims. (Cl. 260—46.5)

This invention relates to a process of neutralizing alkali metal hydroxide catalysts in organopolysiloxanes. More particularly this invention is concerned with the neutralization of alkali metal hydroxide polymerization catalysts in organopolysiloxanes with iodine. This invention is also concerned with the process of neutralizing the alkali-metal hydroxide in an alkali metal hydroxide polymerized organopolysiloxane, which process comprises contacting the organopolysiloxane after polymerization with an amount of iodine which is at least the stoichiometric equivalent of the alkali metal hydroxide employed in the polymerization. This invention is also concerned with a method of removing any excess iodine present in the organopolysiloxane after neutralization of the aforesaid alkali metal hydroxide catalyst which comprises heating the neutralized organopolysiloxane to evaporate the excess iodine.

It is well known in the organopolysiloxane art to cause polymerization of relatively low molecular weight organopolysiloxanes to relatively high molecular weight organopolysiloxanes by an alkali metal hydroxide catalyzed polymerization. Many of the commercially available organopolysiloxane fluids and gums are prepared by this method using potassium hydroxide as the base catalyst. However, it is recognized that the use of potassium hydroxide and other alkali metal hydroxide catalysts results in a product which is not chemically stable. Thus, when an alkali metal hydroxide polymerized organopolysiloxane fluid or gum is allowed to stand in a moist atmosphere at temperatures as low as room temperature, moisture reacts with the alkali metal hydroxide catalyst remaining in the organopolysiloxane to cause degradation of the product to a lower molecular weight state. When these same alkali metal hydroxide polymerized organopolysiloxanes are heated to temperatures of the order of 100 to 250° C., this same type of degradation takes place. Thus, when a gum with an initial viscosity of more than one million centipoises is maintained at a temperature of 250° C. for twenty-three hours, the gum is degraded to a low molecular weight state to such an extent that over 97 percent of the weight of the gum is lost in twenty-three hours.

One solution to the adverse effect of the alkali metal hydroxide catalysts is to remove the catalyst from the organopolysiloxane after polymerization by washing. This washing is effected with fluid organopolysiloxanes by neutralizing the alkali metal hydroxide with a compound such as acetic acid and extracting the sodium acetate formed with water. A disadvantage of this method of removing the alkali metal hydroxide catalyst from the gum is that the extraction process is time consuming and it is difficult to remove all of the acetate from the fluid. In the case of organopolysiloxane gums, the washing is effected by dissolving the gum in a suitable solvent such as toluene, neutralizing the alkali metal hydroxide catalyst, and extracting the neutralization products with water. Although a satisfactory gum or elastomer may be prepared by this method, it is apparent that it is undesirable to have to dissolve the product in a solvent and then remove the solvent after removal of the catalyst.

I have discovered that the alkali metal hydroxide catalysts used to polymerize organopolysiloxanes may be effectively neutralized by treating the polymerization product with iodine in crystalline or liquid form. The iodine reacts with the metal hydroxide catalyst to form iodides and iodates, which are inert with respect to the organopolysiloxanes. Where an excess of iodine is used above that required to effect the neutralization, the excess is removed from the organopolysiloxane by evaporation. When alkali metal hydroxide polymerized organopolysiloxanes are neutralized with iodine by the method of the present invention, the resulting products may be used at temperatures as high as 250° C. for extended periods of time without any appreciable degradation of the high molecular weight product to a lower molecular weight state.

Organopolysiloxanes which may be treated by the method of the present invention may be described as having the average formula:

(1) $$(R)_a SiO_{\frac{4-a}{2}}$$ 

where $a$ has a value from about 1.9 to 2.2 and R is a member selected from the class consisting of alkyl radicals, e. g., methyl, ethyl, propyl, butyl, octyl, etc., radicals; aryl radicals, e. g., phenyl, diphenyl, etc., radicals; alkaryl radicals, e. g., toyly, xylyl, etc., radicals; aralkyl radicals, e. g., benzyl phenylethyl, etc., radicals; haloaryl radicals, e. g., chlorophenyl, dibromophenyl, etc., radicals; and mixtures of the aforesaid radicals. Organopolysiloxane compositions within the scope of Formula 1 are well known in the art and their preparation in the presence of alkali metal hydroxide catalysts is also well known and described, for example, in Hyde Patents 2,490,357 and 2,567,110. In general, these compositions are formed by heating relatively low molecular weight linear, branched-chain or cyclic organopolysiloxanes whose average composition falls within the scope of Formula 1 with from about 0.001 to 0.5 percent of an alkali metal hydroxide at a temperature of about 150° C. Specific starting materials for the preparation of compositions within the scope of Formula 1 include, for example, the linear and branch-chain trimethylsilyl chain-stopped organopolysiloxanes described in Patnode Patents 2,459,888 and 2,469,890. The starting materials also include the cylic diorganosiloxanes such as are described in "An Introduction to the Chemistry of Silicones" by Eugene G. Rochow, John Wiley & Sons (1951). The cyclic compounds include cyclic dimethylsiloxanes, e. g., hexamethyltrisiloxane, octamethylcyclotetrasiloxane, decamethylcyclopentasiloxane, dodecamethylcyclohexasiloxane, etc.; diphenylsiloxanes, e. g., hexaphenylcyclotrisiloxanes, octaphenylcyclotetrasiloxane, etc.; methylphenylsiloxanes, e. g., trimethyltriphenylcyclotrisiloxane, tetramethyltetraphenylcyclotetrasiloxane, etc.

The alkali metal hydroxide catalysts which are used in the preparation of the organopolysiloxanes which may be treated by the process of the present invention include all of the alkali metal hydroxides, i. e., lithium hydroxide, sodium hydroxide, potassium hydroxide, rubidium hydroxide and cesium hydroxide. The process of the present invention is applicable to organopolysiloxanes within the scope of Formula 1 which are polymerized directly with alkali metal hydroxides and also to organopolysiloxanes within the scope of Formula 1 which are polymerized by silanolate salts of alkali metal hydroxides such as are mentioned in the aforesaid Hyde Patent 2,567,110. By the method of the present invention an amount of iodine which is at least about the stoichiometric equivalent of the alkali metal hydroxide catalyst employed in preparing the organopolysiloxane is added to the polymerized organopolysiloxane. By "stoichiometric equivalent" is meant 0.5 mole of iodine ($I_2$) per mole of alkali metal. I have found that the reaction between the iodine and the alkali metal hydroxide is substantially quantitative so that it is not necessary to use an excess of iodine. It is believed that the reaction which takes place upon neutralization of the alkali metal catalyst is as follows when the catalyst is potassium hydroxide:

(2) $\quad 6KOH + 3I_2 \rightarrow 5KI + KIO_3 + 3H_2O$

By the method of the present invention the iodine in crystalline or liquid form (depending on the temperature of the iodine) is merely added to the polymerized organopolysiloxane when it is desired to neutralize the catalyst. In the case of fluid organopolysiloxanes the polymerization reaction is an equilibrium reaction so that both high molecular weight material and low molecular weight material is present after polymerization is completed. This low molecular weight material is usually removed from the system by devolatilization at elevated temperatures and under vacuum. Preferably, neutralization is effected by adding the required amount of iodine to the fluid organopolysiloxane before this devolatilization step. However, the iodine may also be added after devolatilization. An advantage of adding the iodine to the fluid organopolysiloxane before devolatilization is that any excess iodine added will be evaporated from the system during the subsequent devolatilization. Where excess iodine is added after devolatilization, it is desirable to remove the excess by evaporation after neutralization has been effected. The reaction between iodine and the alkali metal hydroxide results in a colloidal suspension of an iodide and an iodate in the neutralized product. This colloidal suspension has no determinable adverse effect on the properties of the finished fluid. However, this suspension may be removed, if desired, by filtering or centrifuging the neutralized product with a surface active material such as fuller's earth or the like. Where iodine is added to a fluid organopolysiloxane it is desirable to add the iodine at a temperature below its boiling point, i. e., below about 184° C., so that the iodine will remain in the fluid for sufficient time to cause neutralization. Since the rate of diffusion of the iodine through the organopolysiloxane is rapid and the reaction between the iodine and the hydroxide is almost instantaneous, the time required for neutralization is generally only a few seconds.

Where iodine is used to neutralize organopolysiloxane gums and elastomers, the iodine may be added after polymerization is completed or at any time at which it is desired to stop the polymerization. In the preparation of organopolysiloxane gums it is customary to effect the reaction between the organopolysiloxane and the alkali metal hyroxide catalyst at temperatures of the order of 150° C. while stirring the reaction mixture. It has been found that the iodine may be added effectively to the stirred gum either after polymerization has been effected and while the gum is maintained at a temperature of about 150° C. or after polymerization and cooling of the gum. As in the case of organopolysiloxane fluids, when neutralizing the catalyst in gums it is desirable to add the iodine to the product at temperatures below the boiling point of iodine to insure the presence of the iodine in the organopolysiloxane for sufficient time to react with the alkali metal hydroxide catalyst. As in the case of the oil, neutralization causes a colloidal suspension of an iodide and an iodate in the gum and any excess iodine is removed by evaporation.

The following examples are illustrative of the practice of my invention and are not intended for purposes of limitation.

EXAMPLE 1

Six 19 gram samples of octamethylcyclotetrasiloxane were prepared containing 0.01 percent, by weight, potassium hydroxide. Varying amounts of iodine in crystalline form were added to five of these samples which had been heated to 150° C. Table I below indicates the number of mols of iodine added per mol of potassium hydroxide, the color of the product at the end of one hour at 150° C., and the physical appearance of the product at the end of one hour at 150° C.

*Table I*

| Mols $I_2$ per Mol KOH | Color of Product | Physical State of Product |
| --- | --- | --- |
| 0.00 | Colorless | Gum. |
| 0.22 | do | Do. |
| 0.44 | do | Viscous Oil. |
| 0.66 | Pink | Fluid. |
| 0.88 | do | Do. |
| 1.32 | do | Do. |

As the table shows, where no iodine or an amount of iodine much below the stoichiometric equivalent of 0.5 mol is added, polymerization of the octamethylcyclotetrasiloxane proceeded in the normal fashion. As the amount of iodine added approached the stoichiometric equivalent, the degree of polymerization was reduced, and as the amount of iodine increased over the stoichiometric equivalent, complete neutralization of the potassium hydroxide occurred and no polymerization took place.

EXAMPLE 2

A methyl silicone gum was prepared by heating a mixture of methylpolysiloxanes containing an average of about 2.001 methyl radicals per silicon atom with 0.01 percent, by weight, potassium hydroxide at 150° C. for about six hours. This gum had a room temperature viscosity of about 500,000 centipoises. Various amounts of iodine in crystalline form were added to a number of samples of this gum which were then heated at 250° C. in open beakers for an extended period of time. During the heating process determinations of the weight loss of each sample as the percentage of the weight of the original sample were made. Table II below lists the mols of iodine per mol of potassium hydroxide in each of the samples and the percent weight loss at various times during the heating cycle.

*Table II*

| Hours at 250° C. | Weight Loss, Percent Mols $I_2$ per Mol KOH | | | | | | |
| --- | --- | --- | --- | --- | --- | --- | --- |
| | 0 | 0.154 | 0.33 | 0.79 | 1.1 | 1.9 | 2.7 |
| 1 | 6.0 | 7.0 | 5.4 | 3.0 | 4.6 | 2.4 | |
| 2 | 8.6 | 11.4 | 6.4 | 3.6 | 5.2 | 3.4 | |
| 3 | 14.4 | | 7.4 | 4.8 | 6.0 | 3.8 | |
| 4 | 18.6 | 15.6 | 7.4 | 4.8 | 6.0 | 4.2 | |
| 6 | 32.0 | 20.8 | 7.6 | 5.2 | | 4.8 | |
| 8 | | 26.8 | | | 6.6 | | |
| 14 | | 35.0 | | | | | |
| 22 | 93.6 | | 9.4 | 6.2 | 7.2 | 5.0 | |
| 23 | 97.2 | | | | | | |
| 24 | | 55.4 | | | | | |
| 32 | | 69.0 | | | | | |

As shown by Table II, neutralization of the potassium hydroxide increased as the amount of iodine approached the stoichiometric equivalent. At amounts of iodine greater than the stoichiometric equivalent, complete neutralization of the potassium hydroxide had occurred so that there was no degradation of the gum to a lower molecular weight state and no subsequent evaporation of the low molecular weight products which usually occurs when a methylpolysiloxane gum containing an alkali metal hydroxide catalyst is heated at 250° C. In the samples containing at least the stoichiometric equivalent of iodine, the weight loss is due to low molecular weight organopolysiloxanes which are in equilibrium with the gum rather than being due to degradation of the gum itself. Since the gums were heated at temperatures above the boiling point of iodine, all of the excess iodine over the stoichiometric equivalent evaporated during the heating process leaving a gum containing only potassium iodide and potassium iodate as colloidal impurities.

Although the examples have described the process of the present invention only with respect to methylpolysiloxanes, it should be understood that other alkyl, aryl, alkaryl, aralkyl, and haloaryl organic substituents may be present in the organopolysiloxane. It should be further understood that the present invention is applicable to low viscosity chain-stopped and non-chain-stopped organopolysiloxane fluids.

The products prepared by the method of the present invention are useful as lubricants, hydraulic fluids, heat transfer media, hydrocarbon oil additives, electrical insulation materials, and as intermediates in the preparation of organopolysiloxane rubbers.

What I claim as new and desire to secure by Letters Patent of the United States is:

1. The process of neutralizing the alkali metal hydroxide in an alkali metal hydroxide polymerized organopolysiloxane gum in which the organo groups are selected from the class consisting of hydrocarbon radicals and halogenated aromatic hydrocarbon radicals, which process comprises (1) contacting the organopolysiloxane gum after polymerization with iodine and (2) heating the product of (1) to a temperature above the boiling point of iodine to evaporate any excess iodine.

2. The process of claim 1 in which the alkali metal hydroxide is potassium hydroxide.

3. The process of neutralizing the alkali metal hydroxide in an alkali metal hydroxide polymerized organopolysiloxane in which the organo groups are selected from the class consisting of hydrocarbon radicals and halogenated aromatic hydrocarbon radicals, which process comprises (1) contacting the organopolysiloxane after polymerization with at least 0.5 mol of iodine per mol of alkali metal hydroxide employed in the polymerization and (2) heating the product of (1) to a temperature above the boiling point of iodine to evaporate any excess iodine.

4. The method of claim 3 in which the alkali metal hydroxide is potassium hydroxide.

5. The process which comprises (1) contacting an organopolysiloxane having an average of 1.9 to 2.2 organic radicals selected from the class consisting of hydrocarbon radicals and halogenated aromatic hydrocarbon radicals per silicon atom and containing an alkali metal hydroxide polymerization catalyst with at least 0.5 mol of iodine per mol of alkali metal hydroxide and (2) heating the product of (1) to a temperature above the boiling point of iodine to evaporate any excess iodine.

6. The process of neutralizing the alkali metal hydroxide catalyst in an alkali metal hydroxide polymerized organopolysiloxane gum in which the organo groups are selected from the class consisting of hydrocarbon radicals and halogenated aromatic hydrocarbon radicals, which process comprises (1) contacting the organopolysiloxane gum after polymerization with at least 0.5 mol of iodine per mol of alkali metal hydroxide employed in the polymerization and (2) heating the product of (1) to a temperature above the boiling point of iodine to evaporate any excess iodine.

References Cited in the file of this patent

UNITED STATES PATENTS

| | | |
|---|---|---|
| 2,443,353 | Hyde | June 15, 1949 |
| 2,489,138 | Hyde | Nov. 22, 1949 |
| 2,490,357 | Hyde | Dec. 6, 1949 |
| 2,716,594 | Harris et al. | Aug. 30, 1955 |